United States Patent
Ong et al.

(10) Patent No.: US 8,895,671 B2
(45) Date of Patent: Nov. 25, 2014

(54) CARBON NANOTUBE CONTAINING RUBBER COMPOSITIONS

(75) Inventors: Christopher Ong, Orange, TX (US); Stephen Pask, Dormagen (DE); Sharon Guo, Shanghai (CN); Yong Zhang, Shanghai (CN); Lan Lu, Shanghai (CN)

(73) Assignee: LANXESS Deutschland GmbH, Cologne (DE)

( * ) Notice: Subject to any disclaimer, the term of this patent is extended or adjusted under 35 U.S.C. 154(b) by 1028 days.

(21) Appl. No.: 12/487,679

(22) Filed: Jun. 19, 2009

(65) Prior Publication Data
US 2013/0261246 A1  Oct. 3, 2013

(30) Foreign Application Priority Data
Jun. 23, 2008  (WO) ............... PCT/CN2008/001215

(51) Int. Cl.
| | |
|---|---|
| C08L 13/00 | (2006.01) |
| C08K 3/04 | (2006.01) |
| C08L 9/02 | (2006.01) |
| C08K 7/24 | (2006.01) |
| C08J 3/24 | (2006.01) |
| C08K 7/06 | (2006.01) |
| C08J 3/20 | (2006.01) |
| C08K 3/06 | (2006.01) |
| C08K 5/14 | (2006.01) |
| C01B 31/02 | (2006.01) |

(52) U.S. Cl.
CPC ... *C08K 7/06* (2013.01); *C08L 9/02* (2013.01); *C08K 7/24* (2013.01); *C08J 3/24* (2013.01); *C08L 13/00* (2013.01); *C08J 3/20* (2013.01); *C08K 3/06* (2013.01); *C08K 5/14* (2013.01); *C01B 31/02* (2013.01); *Y02E 10/549* (2013.01); *C08K 3/04* (2013.01)
USPC ........ 525/332.6; 524/847; 524/853; 524/854; 524/856

(58) Field of Classification Search
USPC .............. 524/847, 853, 854, 856; 525/332.6
See application file for complete search history.

(56) References Cited

U.S. PATENT DOCUMENTS

| 4,983,678 | A | 1/1991 | Saito ........................ 525/193 |
| 5,208,294 | A | 5/1993 | Brown ....................... 525/263 |
| 5,391,627 | A | 2/1995 | Araki et al. ................ 525/274 |
| 7,265,185 | B2 * | 9/2007 | Guo et al. ................. 525/338 |
| 7,927,692 | B2 | 4/2011 | Noguchi et al. | |
| 2005/0065264 | A1 * | 3/2005 | Pazur ........................ 524/445 |
| 2006/0061011 | A1 | 3/2006 | Kikuchi et al. ............ 264/289.3 |
| 2007/0259994 | A1 * | 11/2007 | Tour et al. .................. 523/333 |
| 2009/0099317 | A1 | 4/2009 | Achten et al. | |

FOREIGN PATENT DOCUMENTS

| CN | 1554693 | | 12/2004 |
| DE | 102007042496 | A1 | 5/2008 |
| EP | 1475405 | A1 | 10/2004 |
| EP | 1 770 119 | | 4/2007 |
| JP | 2003 322216 | | 11/2003 |
| JP | 2003342480 | A2 | 12/2003 |
| JP | 2004203332 | A2 | 7/2004 |
| JP | 2004331929 | A2 | 11/2004 |
| JP | 2005-200594 | | 7/2005 |
| WO | 2005/080492 | | 9/2005 |
| WO | 2005/080493 | | 9/2005 |
| WO | WO 2005/080493 | A1 * | 9/2005 |
| WO | 2008041965 | A2 | 10/2008 |

OTHER PUBLICATIONS

Yue et al. (Study on preparation and properties of carbon nanotubes/rubber composites, Springer Science, J Mater Sci 41 (2006) 2541-2544).*
Guo et al. ("Therban XT boosts abrasion resistance, adhesion", Rubber & Plastics News • Oct. 20, 2003).*
Bokobza et al: "Multiwall carbon nanotube elastomeric composites: A review" ScienceDirect Polymer 48 (2007) pp. 4907-4920 XP-022183984.
Lu, L.; Zhai, Y; Zhang, Y; Ong, C; Gou, S; "Reinforcement of hydrogenated carboxylated nitrile-butadiene rubber by multi-walled carbon nanotubes" Applied Surface Science vol. 255 (2008) pp. 2162-2166 XP-002540702.
European Search Report dated Aug. 27, 2009.
Nature, 1985, vol. 318, 162-163 "$C_{60}$: Buckminsterfullerene" Kroto et al.
J. Mater. Chem. 2002, 12, 1952-1958, Bahr & Tour; "Covalent chemistry of single-wall carbon Nanotubes".
Angewandte Chemie-International Edition, 2002, 41, No. 11, 1853-1859;Hirsch; "Functionalization Of Single-Walled Carbon Nanotubes".
Plastics Additives & Compounding, Jan./Feb. 2003, 18-25; Colbert; "Single-wall nanotubes: a new option for conductive plastics and engineering polymers".
Science, 2002, 297,787-792; Baughman, Zakhidov and Heer; "Carbon Nanotubes—the Route Toward Applications".
Nature, 1991, vol. 354, 56-58; Iijima; "Helical microtubules of graphitic carbon".

(Continued)

*Primary Examiner* — Ling Choi
*Assistant Examiner* — Chun-Cheng Wang
(74) *Attorney, Agent, or Firm* — Jennifer R. Seng

(57) ABSTRACT

The present invention provides a vulcanizable composition containing a specific hydrogenated nitrile rubber, at least one cross-linking agent and carbon nanotubes, a process for preparing such composition and the use thereof for preparing vulcanizates. Said vulcanizates exhibit excellent heat performance, oil resistance and mechanical strength.

16 Claims, No Drawings

(56) References Cited

OTHER PUBLICATIONS

Nature, 1993, vol. 363, 605-607; Iijima et al. and Bethune et al. "Cobalt-catalysed growth of carbon nanotubes with single-atomic-layer walls".

Nature, 1997, vol. 388, 756-758; Journet et al.: "Large-scale production of single-walled carbon nanotubes by the electric-arc technique".

Applied Physics A: Materials Science & Processing, 1998, 67, 29-37; Rinzler et al. "Large-scale purification of single-wall carbon nanotubes: process, product, and characterization".

Chemical Physics Letters, Nov. 5, 1999, 313, 91-97; "Gas-phase catalytic growth of single-walled carbon nanotubes from carbon monoxide" Pavel Nikolaev et al.

Applied Physics Letters, 1999, vol. 75, 1086-1088; Ren et al; "Growth of a single freestanding multiwall carbon nanotube on each nononickel dot".

Science, 1998, vol. 282, 1105-1107; Z.F. Ren et al; "Synthesis of Large Arrays of Well-Aligned Carbon Nanotubes on Glass".

Composites Science & Technology, 2003, 63, 1647-1654; Mark D. Frogley et al.; "Mechanical Properties of carbon nanoparticle-reinforced elastomers".

Journal of Material Science, 2006, 41, p. 2541-2544; Dongmei Yue et al; Study on preparation and properties of carbon nanotubes/rubber composites.

Surface Science, 2002, 500(1-3), p. 218-241; Hongjie Dai; "Carbon nanotubes: opportunities and challenges".

Encyclopedia of Polymer Science and Engineering, vol. 4, (Compounding), pp. 66 et seq., 1985.

Encyclopedia of Polymer Science and Engineering, vol. 17, (Vulcanization) pp. 666 et seq., 1989.

International Search Report from co-pending Application PCT/CN2008/001215 dated Mar. 16, 2009, 2 pages.

* cited by examiner

CARBON NANOTUBE CONTAINING RUBBER COMPOSITIONS

The present invention relates to a vulcanizable composition containing a specific hydrogenated nitrile rubber, a cross-linking agent and carbon nanotubes, a process for preparing such compositions, the vulcanization and use thereof.

BACKGROUND OF THE INVENTION

Elastomers in principle have found widespread applications in numerous applications. Furtheron a lot of specialty rubbers are available with dispose of a broad range of mechanical, chemical as well as physical properties. Nitrile rubber (NBR) as well as the hydrogenation product thereof, i.e. hydrogenated nitrile rubber, also abbreviated as "HNBR", represent such specialty rubbers. In particular HNBR has very good heat resistance, an excellent resistance to ozone and chemicals and also an excellent oil resistance. HNBR is used, for example, for seals, hoses, belts and clamping elements in the automobile sector, also for stators, oil well seals and valve seals in the field of oil extraction and also for numerous parts in the aircraft industry, the electronics industry, mechanical engineering and shipbuilding.

However, with the developing of technology, the demands of modern industries for functional rubbery accessories become stricter. It is essential to look for new vulcanizable compounds combining specialty rubbers with additives to improve the properties of elastomeric materials. Since the discovery of carbon nanotubes (CNTs), they have attracted many researchers' attentions owing to their excellent mechanical, electrical and thermal properties. CNTs as reinforcing fillers incorporated into elastomers can improve the mechanical properties of the matrix effectively.

Carbon nanotubes can be viewed as elongated fullerenes (Nature, 1985, Vol. 318, 162). Like fullerenes, carbon nanotubes are made of hexagons, with pentagons only on the ends. Structurally, the shape of a CNT could be imagined that a grapheme sheet rolls into tubule form with end seamless caps together with very high aspect ratios of 1000 or more. As individual molecules, the CNT is believed to be a defect-free structure leading a high strength despite their low density.

There are two basic forms for carbon nanotubes, those produced from a single graphite sheet, referred to as single wall nanotubes (SWNTs), and those nanotubes made up of several concentric sheets known as multi-wall nanotubes (MWNTs). SWNTs have created considerable interest in the academic community with several pertinent reviews on the subject including those by Bahr & Tour (J. Mater. Chem., 2002, 12, 1952), Hirsch (Angewandte Chemie-International Edition, 2002, 41, 1853), Colbert (Plastics Additives & Compounding, January/February 2003, 18) and Baughman & Heer (Science, 2002, 297, 787)

Since carbon nanotubes were discovered more than two decades ago, there have been a variety of techniques developed for producing them. Iijima (Nature, 1991, 354, 56) first observed multi-walled nanotubes. Iijima et al. and Bethune et al. (Nature, 1993, 363, 605) independently reported the synthesis of single-walled nanotubes a few years later. Primary synthesis methods for single and multi-walled carbon nanotubes include arc-discharge (Nature, 1997, 388, 756), laser ablation (Applied Physics A: Materials Science & Processing, 1998, 67, 29), gas-phase catalytic growth from carbon monoxide (Chemical Physics Letters, 1999, 313, 91), and chemical vapor deposition (CVD) from hydrocarbons (Applied Physics Letters, 1999, 75, 1086; Science, 1998, 282, 1105). Subsequent purification steps are required to separate the tubes. The gas-phase processes tend to produce nanotubes with fewer impurities and are more amenable to large-scale processing. Though there are no low-cost, large scale production methods to date, the traditional methods are being developed further and new methods such as fluidized bed reactors are being investigated to create a steady, reasonably priced CNT supply. The low CNT availability and their high prices have limited realization of polymer-CNT composites for many practical applications.

Hydrogenated carboxylated nitrile rubber (also abbreviated as "HXNBR"), prepared by the selective hydrogenation of carboxylated nitrile-conjugated diene rubber (also abbreviated as "XNBR", being a co-polymer comprising repeating units of at least one conjugated diene, at least one unsaturated nitrile, at least one carboxylated monomer and optionally further comonomers), is a specialty rubber which has very good heat resistance, excellent ozone and chemical resistance, and excellent oil resistance. Coupled with the high level of mechanical properties of the rubber (in particular the high resistance to abrasion) it is not surprising that XNBR and HXNBR have found widespread use in the automotive (seals, hoses, bearing pads) oil (stators, well head seals, valve plates), electrical (cable sheeting), mechanical engineering (wheels, rollers) and shipbuilding (pipe seals, couplings) industries, amongst other industries.

The process for preparation of HXNBR polymers has been described in WO-A-2001/077185 while several other patents applications have been filed relating to various compounding techniques with respect to HXNBR polymers like e.g. WO-A-2005/080493 and WO-A-2005/080492.

Carbon nanotubes, sometimes considered as the "ultimate" fibers, have different and interesting applications. One that has not yet been explored in detail is the question of incorporating the tubes into elastomer materials. Up to now solvent mixing, melt mixing and the spray drying process have been employed as processing methods to prepare some rubber/CNTs composites. The rubber matrixes in the existing studies include natural rubber (NR), styrene butadiene rubber (SBR), chloroprene rubber, silicone rubber, fluorocarbon elastomer (FKM) and hydrogenated acrylonitrile rubber (HNBR).

In Composites Science & Technology, 2003, 63, 1647 the impact of using carbon nanoparticles in silicone based elastomers on the mechanical properties of the resulting specimens is investigated. Using single-wall carbon nanotubes or larger carbon nanofibrils leads to an enhancement of the initial modulus of the resulting specimens as a function of the filler load, however, accompanied by a reduction of the ultimate properties.

The incorporation of carbon nanotubes into polymer matrices has already been explored for a variety of polymers such as siloxanes, isoprene rubber, nitrile butadiene, fluoro polymers (FKM), and hydrogenated nitrile butadiene rubber (HNBR).

In Journal of Material Science, 2006, 41, p. 2541 the effect of MWNTs on curing and mechanical properties of HNBR is described. Two methods are used to prepare the nanocomposites. In the first method CNTs were mixed into HNBR directly on a two roll mill with a curing agent at 50° C. for 10 min, and then the corresponding compound was vulcanized at 170° C. through hot pressing for T90. The second method comprised that low molecular liquid HNBR (LHNBR) was firstly dissolved in acetone, subsequently, the surface modified CNTs were added into the solution, and then the ultrasonic dispersion was used on the mixture. Removing the acetone from the mixture by vacuum drying, a compound with CNTs pre-dispersed in LHNBR was obtained. When using this solvent method the highest tensile strength of the HNBR/MWNT—composites was 18.6 MPa with 25 phr MWNT content.

CN 1554693 discloses the modification of HNBR via carbon nanotubes to enhance the heat-resistance, wearability and mechanical strength of HNBR. To prepare the HNBR composite rubber material carbon nanotubes and liquid rubber are ultrasonically mixed firstly and then added into partially hydrogenated nitrile-butadiene rubber to prepare a masterbatch; this masterbatch is then mixed with the remaining amount of hydrogenated nitrile-butadiene rubber, carbon black, zinc oxide and sulfurizing agent. The mixture is blended on a rolling mixer or a Banbury mixer; and then via vulcanization, the carbon nanotube modified hydrogenated nitrile-butadiene rubber is produced.

US 2006/0061011 teaches the heat conductivity dependence of a polymer-carbon nanotube composite relating to the orientation of the carbon nanotubes. The recommended polymer matrices include styrene butadiene rubber (SBR), nitrile rubber (NBR) and hydrogenated nitrile rubber (HNBR). These polymer-carbon nanotube composites have been used for the manufacture of a pneumatic tire and a wheel for a vehicle.

CA 2,530,471 describes methods for the manufacturing of carbon nanotube-elastomer composites. It is further disclosed that the tensile modulus of such composites is enhanced. As elastomers polysiloxanes, polyisoprene, polybutadiene, polyisobutylene, halogenated polyisoprene, halogenated polybutadiene, halogenated polyisobutylene, low-temperature epoxy, EPDM, polyacrylonitrile, acrylonitrile-butadiene rubber, styrene butadiene rubber, EPM and other alpha-olefine based copolymers, as well as some particular fluorine containing copolymers are mentioned.

JP 2003/322216 teaches the manufacture of a toothed belt in which the surface of the tooth belt comprises a polymer latex, such as styrene butadiene rubber, chloroprene rubber, nitrite rubber and hydrogenated nitrile rubber. These polymer composites are generated through the mixing of carbon nanotubes in the presence of a resorcinol-formaldehyde resin.

In view of the steady demand for elastomeric compounds it is the object of the present invention to provide new vulcanizable compounds combining specialty rubbers with additives. Hydrogenated carboxylated acrylonitrile-butadiene rubber ("HXNBR") itself already possesses an attractive property profile encompassing oil resistance, abrasion resistance as well as good adhesion to metals. However, due to the particular carboxyl group content HXNBR has not been investigated in such detail as other commodity elastomers and its behaviour in any compound is not foreseeable based on results which might be available for other more typical elastomers. As, however, the applications for which HXNBR may be suited, are extreme ones such as oil well specialties, high performance belts, and roll coverings there is still room for improvement and new HXNBR based compositions.

SUMMARY OF THE INVENTION

The present invention relates to a vulcanizable composition comprising a hydrogenated carboxylated nitrile rubber, at least one cross-linking agent, and carbon nanotubes, to a process for preparing such vulcanizable composition and to the vulcanization of such compositions as well as the use for preparing moulded articles.

DETAILED DESCRIPTION OF THE INVENTION

The vulcanizable composition according to the invention comprises a hydrogenated carboxylated nitrile rubber, at least one cross-linking agent, and carbon nanotubes.

As used throughout this specification, the term "hydrogenated carboxylated nitrile polymer" or HXNBR is meant to encompass a polymer having repeating units derived a) from at least one conjugated diene, b) at least one α,β-unsaturated nitrile, c) at least one monomer having at least one carboxylic group or a derivative thereof and d) optionally further one or more copolymerizable monomers, in which polymer more than 50% of the residual double bonds (RDB) present in the starting carboxylated nitrile polymer have been hydrogenated, preferably more than 90% of the RDB are hydrogenated, more preferably more than 95% of the RDB are hydrogenated and most preferably more than 99% of the RDB are hydrogenated.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As α,β-unsaturated nitrile, it is possible to use any known 4-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

As a monomer having at least one carboxylic group or a derivative thereof it is possible to use e.g. α,β-unsaturated monocarboxylic or dicarboxylic acids, their esters or amides.

As α,β-unsaturated monocarboxylic or dicarboxylic acids, preference is given to fumaric acid, maleic acid, acrylic acid and methacrylic acid.

As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, n-butyl acrylate, iso-butyl acrylate, tert.-butyl acrylate, n-butyl methacrylate, iso-butyl methacrylate, tert.-butyl methacrylate 2-ethylhexyl acrylate, 2-ethylhexyl methacrylate and octyl acrylate. Particularly preferred alkoxyalkyl esters of α,β-unsaturated carboxylic acids are methoxyethyl(meth)acrylate, ethoxyethyl(meth)acrylate and methoxyethyl(meth)acrylate. It is also possible to use mixtures of alkyl esters, e.g. those mentioned above, with alkoxyalkyl esters, e.g. in the form of those mentioned above.

In a preferred embodiment a hydrogenated terpolymer based on acrylonitrile, butadiene and maleic acid is used. In a further preferred embodiment a hydrogenated terpolymer based on acrylonitrile, butadiene and an alkyl ester of an α,β-unsaturated carboxylic acid, in particular n-butyl acrylate, iso-butyl acrylate, and tert.-butyl acrylate is used.

Typically, the hydrogenated carboxylated nitrile polymer comprises in the range of from
a) 40 to 85 weight percent of repeating units derived from one or more conjugated dienes, preferably butadiene,
b) 15 to 60 weight percent of repeating units derived from one or more α,β-unsaturated nitriles, preferably acrylonitrile, and
c) 0.1 to 30 weight percent of repeating units derived from one or more monomers having at least one carboxylic group or a derivative thereof, preferably from an α,β-unsaturated mono- or dicarboxylic acid and more preferably maleic acid, n-butyl acrylate, iso-butyl acrylate, or tert.-butyl acrylate, wherein the three monomers a), b) and c) have to be chosen in the given ranges, so that they sum up to 100 weight percent.

Preferably, the hydrogenated carboxylated nitrile polymer comprises in the range of from a) 55 to 75 weight percent of repeating units derived from one or more conjugated dienes, preferably butadiene,
b) 25 to 40 weight percent of repeating units derived from one or more α,β-unsaturated nitriles, preferably acrylonitrile, and
c) 1 to 7 weight percent of repeating units derived from one or more monomers having at least one carboxylic group or a derivative thereof, preferably from an α,β-unsaturated mono- or dicarboxylic acid and more preferably maleic acid, n-butyl acrylate, iso-butyl acrylate, or tert.-butyl acrylate,
wherein the three monomers a), b) and c) have to be chosen in the given ranges, so that they sum up to 100 weight percent.

More preferably, the hydrogenated carboxylated nitrite polymer comprises in the range of from
a) 55 to 75 weight percent of repeating units derived from one or more conjugated dienes, preferably butadiene,
b) 25 to 40 weight percent of repeating units derived from one or more α,β-unsaturated nitriles, preferably acrylonitrile, and
c) 1 to 30 weight percent of repeating units derived from one or more monomers having at least one carboxylic group or a derivative thereof, preferably from an α,β-unsaturated mono- or dicarboxylic acid and more preferably maleic acid, n-butyl acrylate, iso-butyl acrylate, or tert.-butyl acrylate,
wherein the three monomers a), b) and c) have to be chosen in the given ranges, so that they sum up to 100 weight percent.

In an alternative embodiment it is possible to use apart from the conjugated diene, the α,β-unsaturated nitrile, and the monomer having at least one carboxylic group or a derivative thereof one or more further copolymerizable monomers. Such copolymerizable monomers are known to those skilled in the art. Therefore the hydrogenated carboxylated nitrile polymer may further comprise repeating units derived from one or more copolymerizable monomers, such as alkylacrylate or styrene. Repeating units derived from such further copolymerizable monomers will replace either the α,β-unsaturated nitrile, or the conjugated diene portion of the nitrile rubber and it will be apparent to the skilled in the art that the above mentioned figures will have to be adjusted to result in 100 weight percent.

The preparation of hydrogenated carboxylated nitrile polymers by polymerization of the abovementioned monomers and a subsequent hydrogenation is adequately known to those skilled in the art and comprehensively described in the polymer literature. Typically such hydrogenated carboxylated nitrile polymers are prepared by radical emulsion polymerisation. Hydrogenated carboxylated nitrile polymers are also commercially available, e.g. as products from the product range of the trade names Therban® from Lanxess Deutschland GmbH.

The hydrogenated carboxylated nitrile polymers used for preparing the vulcanizable compositions according to the present invention typically have a Mooney viscosity (ML 1+4 at 100° C.) in the range from 5 to 90, preferably from 65 to 85. This corresponds to a weight average molecular weight $M_w$ in the range 50 000-500 000, preferably in the range 200 000-450 000. The hydrogenated carboxylated nitrile rubbers used also have a polydispersity $PDI=M_w/M_n$, with $M_w$ being the weight average molecular weight and $M_n$ being the number average molecular weight, in the range 1.7-6.0 and preferably in the range 2.0-3.0.

The determination of the Mooney viscosity (ML 1+4 at 100° C.) is carried out in accordance with ASTM standard D 1646.

Hydrogenated in this invention is preferably understood by more than 50% of the residual double bonds (RDB) present in the starting nitrile polymer/NBR being hydrogenated, preferably more than 90% of the RDB are hydrogenated, more preferably more than 95% of the RDB are hydrogenated and most preferably more than 99% of the RDB are hydrogenated.

The present invention is not restricted to a special process for preparing the hydrogenated carboxylated nitrile rubber. However, the HXNBR preferred in this invention is readily available as disclosed in WO-A-01/077185. For jurisdictions allowing for this procedure, WO-A-01/77185 is incorporated herein by reference.

The vulcanizable composition according to the invention comprises either single-wall carbon nanotubes (SWNTs) or multi-wall carbon nanotubes (MWNTs).

A SWNT is a molecular scale wire that has two key structural parameters. By folding a graphene sheet into a cylinder so that the beginning and end of a lattice vector in the graphene plane join together. The indices determine the diameter of the nanotube, and also the so-called 'chirality'. Tubes are 'arm-chair' tubes, since the atoms around the circumference are in an arm-chair pattern. Nanotubes are termed 'zig-zag' in view of the atomic configuration along the circumference. The other types of nanotubes are chiral, with the rows of hexagons spiraling along the nanotube axes (Surface Science, 2002, 500(1-3), p. 218).

Multi-walled nanotubes (MWNT) consist of multiple layers of graphite rolled in on themselves to form a tube shape.

Such carbon-nanotubes are either commercially available or may be prepared pursuant to processes known from prior art: Primary synthesis methods for single and multi-walled carbon nanotubes include arc discharge (Nature, 1991, 354, p. 56), laser ablation (Applied Physics A: Materials Science & Processing, 1998, 67(1), p. 29), gas-phase catalytic growth from carbon monoxide (Chemical Physics Letters, 1999, 313, p. 91), and chemical vapor deposition (CVD) from hydrocarbons (Applied Physics Letters, 1999, 75(8), p. 1086; Science, 1998, 282, p. 1105) methods. For application of carbon nanotubes in composites, large quantities of nanotubes are required, and the scale-up limitations of the arc discharge and laser ablation techniques would make the cost of nanotube based composites prohibitive. The gas-phase processes tends to produce nanotubes with fewer impurities and are more amenable to large-scale processing. It is a belief that gas phase techniques, such as CVD, for nanotube growth offer the greatest potential for the scaling-up of nanotube production for the processing of composites.

The composition according to the present invention typically comprise 1-50 parts by weight of carbon nanotubes, preferably 1-20 parts by weight, and more preferably 1-10 parts by weight of carbon nanotubes, in each case based on 100 parts by weight of hydrogenated carboxylated nitrile rubber.

The vulcanizable composition according to the present invention furthermore comprises one or more cross-linking agents. The invention is not limited to a special cross-linking agent. Peroxide based cross-linking agents as well as sulfur based cross-linking agents may be used alone or even in mixtures. Peroxide cross-linking agents or in-situ peroxide releasing cross-linking agents are preferred.

The invention is not limited to a special peroxide cross-linking agent. For example, inorganic or organic peroxides are suitable. Preferred are organic peroxides such as dialkylperoxides, ketalperoxides, aralkylperoxides, peroxide ethers, and peroxide esters, such as di-tert.-butylperoxide, bis-(tert.-butylperoxyisopropyl)-benzene, dicumylperoxide, 2,5-dimethyl-2,5-di(tert.-butylperoxy)-hexane, 2,5-dimethyl-2,5-di(tert.-butylperoxy)-hexene-(3), 1,1-bis-(tert.-butylperoxy)-3,3,5-trimethyl-cyclohexane, benzoyl-peroxide, tert.-butylcumylperoxide, tert.-butylperbenzoate and zinc peroxide. Such peroxides are readily commercially available.

Usually the amount of cross-linking agent and in particular of peroxide in the vulcanizable composition is in the range of from 1 to 10 phr (=per hundred parts of rubber, i.e. HXNBR), preferably in the range of from 4 to 8 phr. Peroxides might be applied advantageously in a polymer-bound form. Suitable systems are commercially available, such as Polydispersion T(VC) D-40 P from Rhein Chemie Rheinau GmbH, D (=polymerbound di-tert.-butylperoxy-isopropylbenzene).

In one embodiment the vulcanizable composition comprises
a) 100 parts by weight of HXNBR
b) 1 to 10 parts by weight, preferably 4 to 8 parts by weight of at least one cross-linking agent, based on 100 parts by weight of HXNBR and
c) 1 to 50 parts by weight, preferably 1 to 20 parts by weight, and more preferably 1 to 10 parts by weight of carbon nanotubes, based on 100 parts by weight of HXNBR.

Filler:

The inventive composition further optionally comprises at least one filler. The filler may be an active or an inactive filler or a mixture thereof.

The filler may be in particular:
highly dispersed silicas, prepared e.g. by the precipitation of silicate solutions or the flame hydrolysis of silicon halides, with specific surface areas of in the range of from 5 to 1000 $m^2/g$, and with primary particle sizes of in the range of from 10 to 400 nm; the silicas can optionally also be present as mixed oxides with other metal oxides such as those of Al, Mg, Ca, Ba, Zn, Zr and Ti;
synthetic silicates, such as aluminum silicate and alkaline earth metal silicate like magnesium silicate or calcium silicate, with BET specific surface areas in the range of from 20 to 400 $m^2/g$ and primary particle diameters in the range of from 10 to 400 nm;
natural silicates, such as kaolin and other naturally occurring silica;
glass fibers and glass fiber products (matting, extrudates) or glass microspheres;
metal oxides, such as zinc oxide, calcium oxide, magnesium oxide and aluminum oxide; Magnesium oxide is preferred.
metal carbonates, such as magnesium carbonate, calcium carbonate and zinc carbonate;
metal hydroxides, e.g. aluminum hydroxide and magnesium hydroxide;
carbon blacks; the carbon blacks to be used here are prepared by the lamp black, furnace black or gas black process and have preferably BET (DIN 66 131) specific surface areas in the range of from 20 to 200 $m^2/g$, e.g. SAF, ISAF, HAF, FEF or GPF carbon blacks;
rubber gels, especially those based on polybutadiene, butadiene/styrene copolymers, butadiene/acrylonitrile copolymers and polychloroprene;
or mixtures thereof.

Examples of preferred mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the rubber. For many purposes, the preferred mineral is silica, especially silica made by carbon dioxide precipitation of sodium silicate. Dried amorphous silica particles suitable for use in accordance with the invention may have a mean agglomerate particle size in the range of from 1 to 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil® S and Vulkasil® N, from Lanxess Deutschland GmbH.

Often, use of carbon black as a filler is advantageous. Usually, carbon black is present in the polymer composite in an amount of in the range of from 20 to 200 parts by weight, preferably 30 to 150 parts by weight, more preferably 40 to 100 parts by weight. Further, it might be advantageous to use a combination of carbon black and mineral filler in the inventive polymer composite. In this combination the ratio of mineral fillers to carbon black is usually in the range of from 0.05 to 20, preferably 0.1 to 10.

Further Auxiliary Compounds

The polymer-carbon nanotube composition according to the invention can contain further auxiliary compounds for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry.

These rubber aids may be used in conventional amounts, which depend inter alia on the intended use. Conventional amounts are e.g. from 0.1 to 50 wt. %, based on rubber. Preferably the composition comprises in the range of 0.1 to 20 phr of an organic fatty acid as an auxiliary product, preferably a unsaturated fatty acid having one, two or more carbon double bonds in the molecule which more preferably includes 10% by weight or more of a conjugated diene acid having at least one conjugated carbon-carbon double bond in its molecule. Preferably those fatty acids have in the range of from 8-22 carbon atoms, more preferably 12-18. Examples include stearic acid, palmitic acid and oleic acid and their calcium-, zinc-, magnesium-, potassium- and ammonium salts.

In a further embodiment the vulcanizable composition may comprise in the range of 5 to 50 phr of an acrylate as an auxiliary product. Suitable acrylates are known from EP-A1-0 319 320, in particular p. 3, l. 16 to 35, from U.S. Pat. No. 5,208,294, in particular Col. 2, l. 25 to 40, and from U.S. Pat. No. 4,983,678, in particular Col. 2, l. 45 to 62. Particular reference is made to zinc acrylate, zinc diacrylate or zinc dimethacrylate or a liquid acrylate, such as trimethylolpropanetrimethacrylate (TRIM), butanedioldimethacrylate (BDMA) and ethylenglycoldimethacrylate (EDMA). It might be advantageous to use a combination of different acrylates and/or metal salts thereof. Of particular advantage is often to use metal acrylates in combination with a Scorch-retarder such as sterically hindered phenols (e.g. methylsubstituted aminoalkylphenols, in particular 2,6-di-tert.-butyl-4-dimethylaminomethylphenol).

Preparation of the Vulcanizable Composition According to the Present Invention:

A further object of the invention resides in the preparation of the vulcanizable compositions, wherein the HXNBR, the carbon-nanotubes and the cross-linking agent and optionally any of the other ingredients of the composition are mixed together.

Typically the mixing is performed at an elevated temperature that may range from 20° C. to 200° C.

The mixing may further be performed in the presence of a solvent which is then removed after mixing.

Normally the mixing time does not exceed one hour and a time in the range from 2 to 30 minutes is usually adequate.

The mixing is suitably carried out in an a blending apparatus, e.g. an internal mixer such as a Banbury mixer, or a Haake or Brabender miniature internal mixer. A two roll mill mixer also provides a good dispersion of the carbo-nanotubes as well as of the other optional additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage.

The compounding and vulcanization may be performed as known to any artisan (see e.g. Encyclopedia of Polymer Science and Engineering, Vol. 4, p. 66 et seq. (Compounding) and Vol. 17, p. 666 et seq. (Vulcanization). Typically such vulcanization is performed at a temperature in the range of from 100 to 200° C., preferably 130 to 180° C. In one embodiment the preparation of a polymer vulcanizate comprises subjecting the inventive composition to a vulcanization during injection moulding.

A further object of the invention therefore is a vulcanizate obtained after vulcanization, preferably in the form of moulded articles such as a seal, a roll cover, a belt, a stator or a bearing pad for attachment to a track of a tracked vehicle.

These vulcanizates which may be obtained by vulcanizing the composition according to the present invention display enhanced tensile strength and modulus properties compared to HXNBR while maintaining elongation and strain at break properties.

Examples

The details of the raw materials used in the following Examples are summarized in the following

TABLE 1

| Raw materials | Type/Grades | available from |
|---|---|---|
| HXNBR | Therban ® XT 8999 | Lanxess Deutschland GmbH |
| Multi-walled carbon nanotubes (MWNTs) | Diameter 10~20 nm | Chengdu Organic Chemicals Co., Ltd |
| MgO | Chemical purity (>98.5%) | Sinopharm Chemical Reagent Co., Ltd |
| DCP (dicumylperoxide) | Chemical purity (>98.%) | Sinopharm Chemical Reagent Co., Ltd |

Preparation of Vulcanizable Compositions According to the Invention:

HXNBR and MWNTs were mixed using an internal mixer at the ratio of 9:1 by weight. The masterbatch with 10 wt % MWNTs was diluted into different concentrations of MWNT using a two-roll mill. The final concentration of the MWNTs in HXNBR were 0, 1, 2 and 4 part per hundred parts (phr) of HXNBR (see Table 2). The curing agent DCP was added after HXNBR/MWNTs masticating for 5 min. Finally, the HXNBR mixes were cured at 10° C. for 20 min.

Testing Procedures/Methods:

The tensile strength tests were carried out in an Instron 4465 tensile machine (Instron Co., UK) at a crosshead speed of 500 mm/min. The dumbbell shape samples were 75 mm in length, 1 mm in thickness, and 4 mm in width. Shore A hardness was measured by a hand-held Shore A durometer according to ASTM D2240-97. Results were read after 5 seconds. Dynamic mechanical analysis (DMA) was performed with DMA 242C (NETZSCH, Germany) under nitrogen at a heating rate of 5° C./min from −60° C. 40° C. and a frequency of 1 Hz.

In the following Table 2 all amounts are given in parts per 100 parts by weight of HXNBR.

TABLE 2

| Sample | X1 (comparison) | X2 | X3 | X4 |
|---|---|---|---|---|
| HXNBR | 100 | 100 | 100 | 100 |
| MWNTs | — | 1 | 2 | 4 |
| MgO | 5 | 5 | 5 | 5 |
| DCP | 3 | 3 | 3 | 3 |
| Hardness, Shore A | 61 | 63 | 65 | 67 |
| Tensile strength (MPa) | 26.5 | 28.2 | 35.3 | 37.1 |
| Elongation at break (%) | 440 | 434 | 456 | 424 |
| Modulus at 100% strain (MPa) | 1.9 | 2.2 | 2.6 | 3.5 |
| Modulus at 200% strain (MPa) | 3.4 | 4.2 | 5.2 | 7.3 |
| Modulus at 300% strain (MPa) | 6.8 | 8.1 | 9.4 | 13.2 |
| Permanent set (%) | 5 | 5 | 8 | 8 |

As may be seen from Table 2 the addition of the MWNTs to HXNBR result in a significant reinforcement. The addition of MWNTs in particular resulted in considerable benefits to the physical properties and the magnitude of property enhancement could be related to the level of carbon nanotubes included in the composite recipe. The benefits to the polymer composite include, but are not restricted to an increase of the tensile strength, an increase, of the polymer composite modulus at 100, 200 and 300% strain and eventually an increase in hardness of the polymer composite.

What is claimed is:

1. A vulcanizable composition comprising a hydrogenated carboxylated nitrile rubber (HXNBR) having a Mooney Viscosity (ML 1+4 @ 100° C.) in the range from 65-85, at least one cross-linking agent and 1 to 10 parts by weight of carbon nanotubes, based on 100 parts by weight of HXNBR.

2. The vulcanizable composition according to claim 1, wherein the carbon nanotubes are either a single-walled carbon nanotubes or a multiple-walled carbon nanotubes.

3. The vulcanizable composition according to claim 1 or 2, wherein the carbon nanotubes have an average diameter of between 5 and 30 nm.

4. The vulcanizable composition according to claim 1 or 2, wherein the hydrogenated carboxylated nitrile polymer comprises in the range of from
   a) 40 to 85 weight percent of repeating units derived from one or more conjugated dienes,
   b) 15 to 60 weight percent of repeating units derived from one or more α,β-unsaturated nitriles, and
   c) 0.1 to 30 weight percent of repeating units derived from one or more monomers having at least one carboxylic group or a derivative thereof, wherein the three monomers a), b) and c) have to be chosen in the given ranges, so that they sum up to 100 weight percent.

5. The vulcanizable composition according to claim 1 or 2, wherein the hydrogenated carboxylated nitrile polymer comprises in the range of from
   a) 40 to 85 weight percent of repeating units derived from butadiene,
   b) 15 to 60 weight percent of repeating units derived from acrylonitrile, and
   c) 0.1 to 30 weight percent of repeating units derived from an α,β-unsaturated mono- or dicarboxylic acid,
   wherein the three monomers a), b) and c) have to be chosen in the given ranges, so that they sum up to 100 weight percent.

6. The vulcanizable composition according to claim 1 or 2, wherein the hydrogenated carboxylated nitrile polymer comprises in the range of from
   a) 40 to 85 weight percent of repeating units derived butadiene,
   b) 15 to 60 weight percent of repeating units derived acrylonitrile, and
   c) 0.1 to 30 weight percent of repeating units derived from maleic acid, n-butyl acrylate, iso-butyl acrylate, or tert.-butyl acrylate,
   wherein the three monomers a), b) and c) have to be chosen in the given ranges, so that they sum up to 100 weight percent.

7. The vulcanizable composition according to claim 1 or 2, wherein the cross-linking agent is either a peroxide, a peroxide releasing compound or sulfur.

8. The vulcanizable composition according to claim 1 or 2 comprising
   1) 100 parts by weight of HXNBR
   2) 1 to 10 parts by weight of at least one cross-linking agent, based on 100 parts by weight of HXNBR and
   3) 1 to 10 parts by weight of carbon nanotubes, based on 100 parts by weight of HXNBR.

9. The vulcanizable composition according to claim 1 or 2 comprising
   1) 100 parts by weight of HXNBR
   2) 4 to 8 parts by weight of at least one cross-linking agent, based on 100 parts by weight of HXNBR and
   3) 1 to 10 parts by weight of carbon nanotubes, based on 100 parts by weight of HXNBR.

10. A process for preparing the vulcanizable composition according to claim 1, wherein the HXNBR, the carbon-nanotubes and the cross-linking agent are mixed together.

11. The process according to claim 10, wherein the mixing is performed at a temperature in the range from 20° C. to 200° C.

12. The process according to claim 10, wherein the mixing is performed in the presence of a solvent which is then removed after mixing.

13. A method of preparing polymer vulcanizates comprising subjecting the composition according to claim 1 to vulcanization.

14. The method of preparing polymer vulcanizates according to claim 13 comprising subjecting the composition to vulcanization during injection moulding.

15. A polymer vulcanizate prepared by the process according to claim 13.

16. The polymer vulcanizate according to claim 15 having the form of a seal, a roll cover, a belt, a stator or a bearing pad for attachment to a track of a tracked vehicle.

* * * * *